(12) United States Patent
Zhang et al.

(10) Patent No.: US 12,445,875 B2
(45) Date of Patent: Oct. 14, 2025

(54) CELL GLOBAL IDENTITY CGI PROCESSING METHOD AND DEVICE

(71) Applicant: Huawei Technologies Co., Ltd., Shenzhen (CN)

(72) Inventors: Li Zhang, Beijing (CN); Jiantao Xue, Beijing (CN); Jing Han, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 441 days.

(21) Appl. No.: 17/819,400

(22) Filed: Aug. 12, 2022

(65) Prior Publication Data

US 2022/0400397 A1    Dec. 15, 2022

Related U.S. Application Data

(63) Continuation of application No. PCT/CN2021/076116, filed on Feb. 8, 2021.

(30) Foreign Application Priority Data

Feb. 14, 2020  (CN) .......................... 202010093320.1

(51) Int. Cl.
*H04W 24/08* (2009.01)
*H04W 16/14* (2009.01)
*H04W 72/0453* (2023.01)

(52) U.S. Cl.
CPC ........... *H04W 24/08* (2013.01); *H04W 16/14* (2013.01); *H04W 72/0453* (2013.01)

(58) Field of Classification Search
None
See application file for complete search history.

(56) References Cited

U.S. PATENT DOCUMENTS

2015/0296526 A1    10/2015    Behravan et al.
2018/0359700 A1    12/2018    Sasanapuri et al.
(Continued)

FOREIGN PATENT DOCUMENTS

CN    103621138 A    3/2014
EP    2916584 A1    9/2015
(Continued)

OTHER PUBLICATIONS

Apple, "CR on UE measurements capability and reporting criteria for NR-U", 3GPP TSG-RAN4 Meeting #93, R4-1913498, Reno, Nevada, US, Nov. 18-22, 26 pages.
(Continued)

*Primary Examiner* — Christine T Duong
(74) *Attorney, Agent, or Firm* — SLATER MATSIL, LLP

(57) ABSTRACT

This application relates to the field of wireless communication technologies. The method includes: A terminal device receives a CGI reading command sent by a network device, and determines, based on a control parameter, a resource sharing manner of first measurement and CGI reading on an overlapped resource between a measurement resource of the first measurement and a reading resource of the CGI reading, where the control parameter is a parameter indicating that the first measurement and the CGI reading perform resource sharing on the overlapped resource. The terminal device performs the first measurement and the CGI reading in the determined resource sharing manner.

16 Claims, 4 Drawing Sheets

Target frequency F1 of cell global identity CGI reading (inter-frequency)

Frequency F2 (inter-frequency)

Frequency F3 (intra-frequency)

Measurement gap

(56) References Cited

U.S. PATENT DOCUMENTS

2019/0274146 A1  9/2019  Tang et al.
2020/0413460 A1* 12/2020  Tang ................. H04W 36/0061
2023/0102370 A1*  3/2023  Thangarasa ....... H04W 52/0251
                                                        370/311

FOREIGN PATENT DOCUMENTS

| EP | 3331288 A1 | 6/2018 |
| EP | 3706456 A1 | 9/2020 |
| WO | 2015185518 A1 | 12/2015 |
| WO | 2019072904 A1 | 4/2019 |
| WO | 2019085959 A1 | 5/2019 |

OTHER PUBLICATIONS

Intel, "Editorial CR on Section 9.1 and Section 9.6", 3GPP TSG-RAN4 Meeting #92, R4-1909733, Ljubljana, Slovenia, Aug. 26-30, 2019, 24 pages.

Huawei et al., "CR on gap sharing for Inter-frequency measurement requirement without MG", 3GPP TSG-RAN4 Meeting #93, R4-1914444, Reno, Nevada, US, Nov. 18-22, 13 pages.

Mediatek Inc, "CR on TS38.133 for SFTD measurement requirements for NR SA (Section 9.1.5.2)", 3GPP TSG-RAN WG4 Meeting #92, R4-1910116, Ljubljana, Slovenia, Aug. 26-30, 2019, 6 pages.

Mediatek Inc, "CR on TS38.133 for CSSF outside gap when SFTD measurement is configured (Section 9.1.5)", 3GPP TSG-RAN WG4 Meeting #91, R4-1907755, May 3, 2019, Reno, Nevada, US, May 13-17, 2019, 7 pages.

Qualcomm Inc, "Discussion on open issues in dense PRS gap for eMTC", 3GPP TSG-RAN WG4 Meeting #87, R4-1806872, Busan, South Korea, May 21-25, 2018, 4 pages.

Ericsson, "Further considerations on CGI reading requirements in autonomous gaps for R16", 3GPP TSG-RAN WG4 #93, R4-1914641, Reno, NV, US, Nov. 18, 2019, 8 pages.

* cited by examiner

CELL GLOBAL IDENTITY CGI PROCESSING METHOD AND DEVICE

CROSS-REFERENCE TO RELATED APPLICATIONS

This application is a continuation of International Application No. PCT/CN2021/076116, filed on Feb. 8, 2021, which claims priority to Chinese Patent Application No. 202010093320.1, filed on Feb. 14, 2020. The disclosures of the aforementioned applications are hereby incorporated by reference in their entireties.

TECHNICAL FIELD

This application relates to the field of wireless communication technologies, and in particular, to a cell global identity (CGI) processing method and device.

BACKGROUND

In a wireless communication scenario, user equipment (UE) may need to perform a plurality of types of measurement. For example, the UE needs to perform inter-frequency single frequency network and frame timing difference (single frequency network and frame timing difference, SFTD) measurement, L3 measurement (for example, reference signal received power (RSRP)), L1 measurement (for example, layer 1 reference signal received power (L1-RSRP)), and reference signal time difference (RSTD) measurement. When the UE performs the foregoing measurement, measurement resources may overlap. Therefore, a sharing rule for measurement resources between different types of measurement is defined in the 38.133 protocol.

In a conventional technology, a network device may further configure the UE to read a cell global identity (CGI) of a target cell. After receiving a CGI reading command sent by the network device, the UE needs to attempt to demodulate a master information block (MIB) of the target cell within a period of time specified by the network device, obtain scheduling information of a system information block 1 (SIB1) in the MIB, and read the CGI of the target cell from the SIB1. A reading resource of CGI reading of the UE may overlap the measurement resource of the UE. However, currently, there is no sharing rule for the resource of the CGI reading and the measurement resource.

SUMMARY

This application provides a cell global identity CGI processing method and device, to provide a resource sharing rule for CGI reading and terminal measurement when a reading resource of the CGI reading overlaps a measurement resource of the terminal measurement.

According to a first aspect, an embodiment of this application provides a CGI processing method, including: A terminal device receives a CGI reading command sent by a network device. The terminal device determines, based on a control parameter, a resource sharing manner of first measurement and CGI reading on an overlapped resource between a measurement resource of the first measurement and a reading resource of the CGI reading, where the control parameter is a parameter indicating that the first measurement and the CGI reading perform resource sharing on the overlapped resource. The terminal device performs the first measurement and the CGI reading in the determined resource sharing manner.

Based on this solution, the terminal device may determine, based on the control parameter, the resource sharing manner of the first measurement and the CGI reading on the overlapped resource, and perform the first measurement and the CGI reading in the determined resource sharing manner.

In a possible implementation, the CGI reading includes a first substep and a second substep. That the terminal device determines, based on a control parameter, a resource sharing manner of first measurement and CGI reading on an overlapped resource between a measurement resource of the first measurement and a reading resource of the CGI reading includes: The terminal device determines, based on the control parameter, a resource sharing manner of the first measurement and the first substep and a resource sharing manner of the first measurement and the second substep on the overlapped resource between the measurement resource of the first measurement and the reading resource of the CGI reading.

Based on this solution, the terminal device may separately determine, based on the control parameter, the resource sharing manner of the first substep and the first measurement and the resource sharing manner of the second substep and the first measurement on the overlapped resource, where the first substep and the second substep are included in the CGI reading.

In a possible implementation, before that the terminal device determines, based on a control parameter, a resource sharing manner of first measurement and CGI reading on an overlapped resource between a measurement resource of the first measurement and a reading resource of the CGI reading, the method further includes: The terminal device receives the control parameter sent by the network device.

Based on this solution, the network device may indicate the control parameter to the terminal device, so that the terminal device may determine, based on the control parameter, the resource sharing manner of the first measurement and the CGI reading on the overlapped resource, and perform the first measurement and the CGI reading in the determined resource sharing manner.

In a possible implementation, the control parameter includes at least one of the following: a frequency range, a time range, and a specified measurement type.

Based on this solution, the terminal device may determine, based on the frequency range, the time range, or the specified measurement type, the resource sharing manner of the first measurement and the CGI reading on the overlapped resource, and perform the first measurement and the CGI reading in the determined resource sharing manner.

In a possible implementation, when the control parameter includes the specified measurement type, the first measurement and the CGI reading perform resource sharing in a first resource sharing manner if a measurement type of the first measurement is the specified measurement type; or the first measurement and the CGI reading perform resource sharing in a second resource sharing manner if a measurement type of the first measurement is another type other than the specified measurement type. Alternatively, when the control parameter includes the frequency range, the first measurement and the CGI reading perform resource sharing in a first resource sharing manner within the frequency range; or the first measurement and the CGI reading perform resource sharing in a second resource sharing manner beyond the frequency range. Alternatively, when the control parameter includes the time range, the first measurement and the CGI reading perform resource sharing in a first resource sharing manner within the time range; or the first measurement and the CGI reading perform resource sharing in a second resource sharing manner beyond the time range. Alternatively, when the control parameter includes the frequency range and the time range, the first measurement and the CGI reading perform resource sharing in a first resource sharing manner within the frequency range and the time range. Alternatively, when the control parameter includes the frequency range and the specified measurement type, the first measurement and the CGI perform resource sharing in a first resource sharing manner within the frequency range if a measurement type of the first measurement is the specified measurement type. Alternatively, when the control parameter includes the time range and the specified measurement type, the first measurement and the CGI perform resource sharing in a first resource sharing manner within the time range if a measurement type of the first measurement is the specified measurement type. Alternatively, when the control parameter includes the frequency range, the time range, and the specified measurement type, the first measurement and the CGI perform resource sharing in a first resource sharing manner within the time range and the frequency range if a measurement type of the first measurement is the specified measurement type.

Based on this solution, the terminal device may determine the resource sharing manner of the first measurement and the CGI reading on the overlapped resource, and perform the first measurement and the CGI reading in the determined resource sharing manner.

In a possible implementation, the first resource sharing manner is to perform the CGI reading on the overlapped resource; and the second resource sharing manner is a resource sharing manner of a reference measurement type and the first measurement on the overlapped resource.

Based on this solution, when the resource sharing manner of the first measurement and the CGI reading on the overlapped resource is the first resource sharing manner, the terminal device may perform only the CGI reading on the overlapped resource. When the resource sharing manner of the first measurement and the CGI reading on the overlapped resource is the second resource sharing manner, the terminal device may separately perform the CGI reading and the first measurement on the overlapped resource.

In a possible implementation, the method further includes: The terminal device determines, based on the control parameter, a first relaxation factor for a time requirement of the CGI reading and a second relaxation factor for a time requirement of the first measurement. That the terminal device performs the first measurement and the CGI reading in the determined resource sharing manner includes: The terminal device performs the first measurement and the CGI reading in the determined resource sharing manner based on the first relaxation factor and the second relaxation factor.

Based on this solution, if the terminal device may determine, based on the control parameter, the first relaxation factor for the CGI reading and the second relaxation factor for the first measurement, the terminal device may perform the first measurement and the CGI reading on the overlapped resource based on the first relaxation factor and the second relaxation factor.

In a possible implementation, within the frequency range and the time range, if a measurement type of the first measurement is the specified measurement type, the first relaxation factor is a specified value. Alternatively, if a measurement type of the first measurement is another type other than the specified measurement type, the first relaxation factor is a relaxation factor for a reference measurement type when a measurement resource of the reference measurement type overlaps a measurement resource of the another type. Alternatively, beyond the frequency range or the time range, the first relaxation factor is a relaxation factor for a reference measurement type when a measurement resource of the reference measurement type overlaps the measurement resource of the first measurement.

Based on this solution, the terminal device may determine the first relaxation factor for the CGI reading.

In a possible implementation, within the frequency range and the time range, if a measurement type of the first measurement is the specified measurement type, the second relaxation factor is undefined. Alternatively, if a measurement type of the first measurement is another type other than the specified measurement type, the second relaxation factor is a relaxation factor for the another type when a measurement resource of the another type overlaps a measurement resource of a reference measurement type. Alternatively, beyond the frequency range or the time range, the second relaxation factor is a relaxation factor for the first measurement when the measurement resource of the first measurement overlaps a measurement resource of a reference measurement type.

Based on this solution, the terminal device may determine the second relaxation factor for the first measurement.

In a possible implementation, after that the terminal device performs the first measurement and the CGI reading in the determined resource sharing manner, the method further includes: The terminal device sends a read CGI to the network device.

Based on this solution, the terminal device may send the read CGI to the network device, so that the network device masters cell information.

According to a second aspect, an embodiment of this application further provides another CGI processing device, including: A network device generates a control parameter, where the control parameter is a parameter indicating that first measurement and CGI reading perform resource sharing on an overlapped resource between a measurement resource of the first measurement and a reading resource of the CGI reading. The network device sends a CGI reading command and the control parameter to a terminal device.

In a possible implementation, the CGI reading includes a first substep and a second substep. That a network device generates a control parameter includes: The network device generates control parameters of the first substep and the second substep.

In a possible implementation, the control parameter includes at least one of the following: a frequency range, a time range, and a specified measurement type.

In a possible implementation, when the control parameter includes the specified measurement type, the first measurement and the CGI reading perform resource sharing in a first resource sharing manner if a measurement type of the first measurement is the specified measurement type; or the first measurement and the CGI reading perform resource sharing in a second resource sharing manner if a measurement type of the first measurement is another type other than the specified measurement type. Alternatively, when the control parameter includes the frequency range, the first measurement and the CGI reading perform resource sharing in a first resource sharing manner within the frequency range; or the first measurement and the CGI reading perform resource sharing in a second resource sharing manner beyond the frequency range. Alternatively, when the control parameter includes the time range, the first measurement and the CGI reading perform resource sharing in a first resource sharing manner within the time range; or the first measurement and the CGI reading perform resource sharing in a second resource sharing manner beyond the time range. Alternatively, when the control parameter includes the frequency range and the time range, the first measurement and the CGI reading perform resource sharing in a first resource sharing manner within the frequency range and the time range. Alternatively, when the control parameter includes the frequency range and the specified measurement type, the first measurement and the CGI perform resource sharing in a first resource sharing manner within the frequency range if a measurement type of the first measurement is the specified measurement type. Alternatively, when the control parameter includes the time range and the specified measurement type, the first measurement and the CGI perform resource sharing in a first resource sharing manner within the time range if a measurement type of the first measurement is the specified measurement type. Alternatively, when the control parameter includes the frequency range, the time range, and the specified measurement type, the first measurement and the CGI perform resource sharing in a first resource sharing manner within the time range and the frequency range if a measurement type of the first measurement is the specified measurement type.

In a possible implementation, the first resource sharing manner is to perform the CGI reading on the overlapped resource; and the second resource sharing manner is a resource sharing manner of a reference measurement type and the first measurement on the overlapped resource.

In a possible implementation, the method further includes: The network device determines, based on the control parameter, a first relaxation factor for a time requirement of the CGI reading and a second relaxation factor for a time requirement of the first measurement.

In a possible implementation, within the frequency range and the time range, if a measurement type of the first measurement is the specified measurement type, the first relaxation factor is a specified value. Alternatively, if a measurement type of the first measurement is another type other than the specified measurement type, the first relaxation factor is a relaxation factor for a reference measurement type when a measurement resource of a reference measurement type overlaps a measurement resource of the another type. Alternatively, beyond the frequency range or the time range, the first relaxation factor is a relaxation factor for a reference measurement type when a measurement resource of the reference measurement type overlaps the measurement resource of the first measurement.

In a possible implementation, within the frequency range and the time range, if a measurement type of the first measurement is the specified measurement type, the second relaxation factor is undefined; or Alternatively, if a measurement type of the first measurement is another type other than the specified measurement type, the second relaxation factor is a relaxation factor for the another type when a measurement resource of the another type overlaps a measurement resource of a reference measurement type. Alternatively, beyond the frequency range or the time range, the second relaxation factor is a relaxation factor for the first measurement when the measurement resource of the first measurement overlaps the measurement resource of the reference measurement type.

In a possible implementation, after that the network device sends a CGI reading command and the control parameter to a terminal device, the method further includes: The network device receives a CGI sent by the terminal device.

According to a third aspect, an embodiment of this application further provides a terminal device. The terminal device may be configured to perform operations according to any one of the first aspect and the possible implementations of the first aspect. For example, the terminal device may include modules or units configured to perform the operations according to any one of the first aspect or the possible implementations of the first aspect, for example, include a processing unit and a transceiver unit.

According to a fourth aspect, an embodiment of this application further provides a network device. The network device may be configured to perform operations according to any one of the second aspect and the possible implementations of the second aspect. For example, the network device may include modules or units configured to perform the operations according to any one of the second aspect or the possible implementations of the second aspect, for example, include a processing unit and a transceiver unit.

According to a fifth aspect, an embodiment of this application further provides a communication system, including the terminal device according to the third aspect and the network device according to the fourth aspect.

According to a sixth aspect, an embodiment of this application provides a chip system. The chip system includes a processor, and optionally further includes a memory. The memory is configured to store a computer program. The processor is configured to invoke the computer program from the memory and run the computer program, to enable a communication device on which the chip system is installed to perform the method according to any one of the first aspect or the possible implementations of the first aspect; and/or to enable a communication device on which the chip system is installed to perform the method according to any one of the second aspect or the possible implementations of the second aspect.

According to a seventh aspect, an embodiment of this application provides a computer program product. The computer program product includes computer program code. When the computer program code is run by a communication unit and a processing unit or a transceiver and a processor of a communication device, the communication device is enabled to perform the method according to any one of the first aspect or the possible implementations of the first aspect; and/or a communication device in which a chip system is installed is enabled to perform the method according to any one of the second aspect or the possible implementations of the second aspect.

According to an eighth aspect, an embodiment of this application provides a computer-readable storage medium. The computer-readable storage medium stores a program, and the program enables a communication device (for example, a terminal device) to perform the method according to any one of the first aspect or the possible implementations of the first aspect; and/or enables a communication device (for example, a core network device) on which a chip system is installed to perform the method according to any one of the second aspect or the possible implementations of the second aspect.

DETAILED DESCRIPTION OF ILLUSTRATIVE EMBODIMENTS

Figure 1:
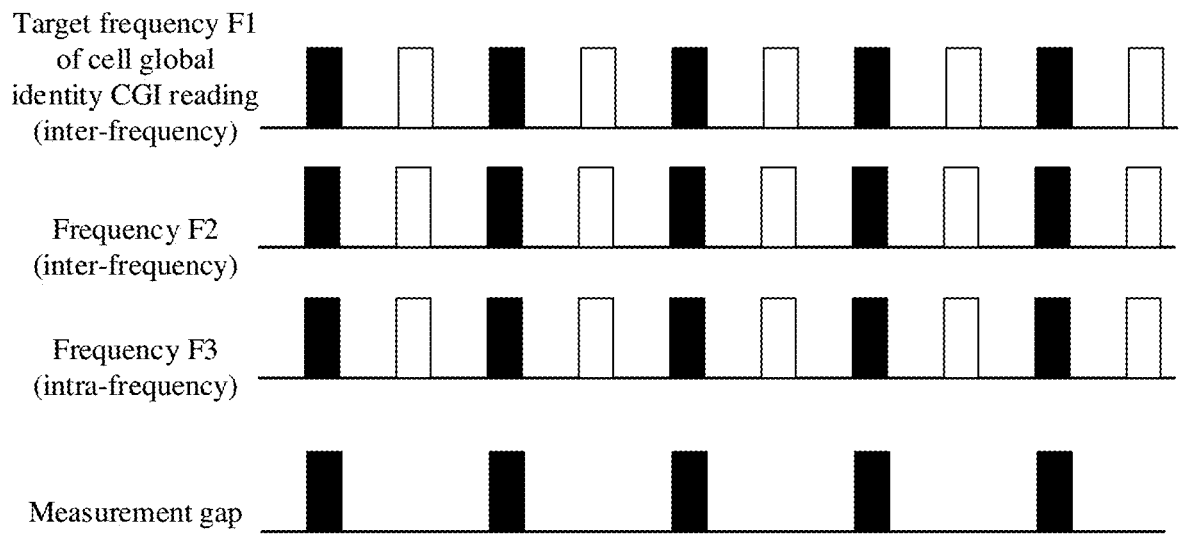
FIG. 1 is a schematic diagram of a resource sharing manner of different measurement types on an overlapped resource according to this application.

The following explains and describes terms in embodiments of this application, to understand a CGI processing method in embodiments of this application more clearly.

(1) A measurement resource is a time-frequency resource occupied by a to-be-measured reference signal. For example, a measurement resource of L3 measurement is an SMTC window configured by a network, and a measurement resource of L1 measurement is an SSB resource or a CSI-RS resource specified by the network. A CGI reading resource is a time-frequency resource occupied by an MIB and an SIB1 of a target cell for CGI reading.

(2) A resource sharing manner is a manner in which UE allocates, on an overlapped resource between measurement resources of a same type or different types of measurement, the overlapped resource between different measurement. For example, SMTC windows corresponding to L3 measurement on two frequencies completely overlap. A resource sharing manner is to evenly allocate measurement resources to the measurement of the two frequencies based on a ratio of 1:1.

(3) A time requirement is not relaxed, which means that a type of measurement needs to be completed within a time requirement of the type of measurement. For example, if a time requirement for L3 measurement of a single frequency is 20 s, the L3 measurement of the single frequency needs to be completed within 20 s. If a resource of measurement needs to be shared with that of another measurement, the time requirement may be relaxed. For example, for L3 measurement of two frequencies, each frequency can use only a half of measurement resources due to resource sharing, and a time requirement of measurement of each frequency applies to a relaxation factor 2. That is, the measurement of each frequency needs to be completed within 40 s.

Currently, a network device may configure user equipment (UE) to perform a plurality of types of measurement. However, when the UE performs the plurality of types of measurement, measurement resources of the types of measurement may overlap. Therefore, a rule for resource sharing between different types of measurement is defined in the 38.133 protocol.

1. Resource sharing between inter-frequency SFTD measurement and layer 3 (L3) measurement: A time requirement for SFTD measurement is not relaxed, and there is no time requirement for L3 measurement. That is, during SFTD measurement, the UE performs the SFTD measurement on an overlapped resource between measurement resources of the inter-frequency SFTD measurement and the L3 measurement.

2. Resource sharing between RSTD measurement and L3 measurement: A time requirement for RSTD measurement is not relaxed, and the UE has no time requirement for L3 measurement during RSTD measurement. That is, the UE performs the RSTD measurement on an overlapped resource between measurement resources of the RSTD measurement and the L3 measurement.

3. Resource sharing between L1 measurement and L3 measurement: When a measurement resource of L3 measurement partially overlaps a measurement resource of L1 measurement, a time requirement for the L1 measurement is relaxed. That is, the UE performs only the L3 measurement on an overlapped resource between the measurement resources of the L3 measurement and the L1 measurement. When the measurement resource of the L3 measurement completely overlaps the measurement resource of the L1 measurement, the time requirements for both the L3 measurement and the L1 measurement are relaxed. That is, the L1 measurement and the L3 measurement are performed based on a fixed ratio on an overlapped resource between the measurement resources of the L3 measurement and the L1 measurement.

In addition, a sharing manner of measurement resources of a same type of measurement on different frequencies is further defined in the 38.133 protocol. The following describes a current sharing manner of measurement resources of a same type of measurement on different frequencies by using FIG. 1 as an example.

As shown in FIG. 1, each small rectangle represents one SMTC. The UE separately performs SMTC overlapping of L3 measurement on F1, F2, and F3, and a measurement gap of the UE overlaps some SMTCs (for example, black SMTCs in FIG. 1). F1 and F2 are inter-frequency frequencies. Therefore, the UE needs to perform the L3 measurement on the measurement gap when performing the L3 measurement on F1 and F2. F3 is an intra-frequency frequency. The UE needs to perform measurement on white SMTCs when performing the L3 measurement on F3.

For the L3 measurement on F1 and F2, the UE may perform the L3 measurement on black SMTCs based on a ratio of 1:1. To be specific, the L3 measurement may be performed on F1 on the first black SMTC, the L3 measurement may be performed on F2 on the second black SMTC, the L3 measurement may be performed on F1 on the third black SMTC, and so on. For the L3 measurement on F3, the UE performs the L3 measurement on the white SMTCs.

Currently, the network device may further configure the UE to read a CGI of a target cell. After receiving a CGI reading command sent by the network device, the UE attempts to demodulate an MIB and an SIB1 of the target cell. When the MIB of the target cell is sent with an SSB of the target cell, a resource for reading the MIB is an SMTC window of the target cell. Therefore, a resource for the SIB1 of the target cell is determined by a base station of the target cell. The resource may be within the SMTC window, or may be outside the SMTC window, or may overlap a resource of L1 measurement of a serving cell. Therefore, a resource for the UE to perform the CGI reading may overlap a measurement resource of the L3 measurement and/or a measurement resource of the L1 measurement of the serving cell. However, currently, there is no manner of resource sharing between the resource of the CGI reading and another measurement resource.

Based on the foregoing requirement, an embodiment of this application provides a CGI processing method. The technical solutions in this embodiment of this application may be applied to various communication systems, for example, a long term evolution (LTE) system, a worldwide interoperability for microwave access (WiMAX) communication system, a future 5th generation (5G) system such as a new radio access technology (NR), and a future communication system such as a 6G system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be further used.

In addition, the term "for example" in this embodiment of this application is used to represent giving an example, an illustration, or a description. Any embodiment or design solution described as the "example" in this application should not be explained as being more preferred or having more advantages than another embodiment or design solution. Exactly, the term "example" is used to present a concept in a specific manner.

In this embodiment of this application, information, signal, message, or channel may be interchangeably used sometimes. It should be noted that meanings expressed by the terms are consistent when differences between the terms are not emphasized. "Of", "relevant", and "corresponding" may be interchangeably used sometimes. It should be noted that meanings expressed by the terms are consistent when differences between the terms are not emphasized.

A network architecture and a service scenario that are described in this embodiment of this application are intended to describe the technical solutions in this embodiment of this application more clearly, and do not constitute a limitation on the technical solutions provided in this embodiment of this application. A person of ordinary skill in the art may know that, with evolution of the network architecture and emergence of new service scenarios, the technical solutions provided in this embodiment of this application are also applicable to similar technical problems.

Embodiments of this application may be applied to a conventional typical network or a future UE-centric network. A non-cell network architecture is introduced to the UE-centric network. To be specific, a large quantity of small cells are deployed in a specific area to form a hyper cell. Each small cell is a transmission point (TP) or a transmission and reception point (TRP) of the hyper cell, and is connected to a centralized controller. When the UE moves in the hyper cell, a network side device selects a new sub-cluster for the UE to serve the UE, to avoid a real cell handover and implement UE service continuity. The network side device includes a wireless network device. Alternatively, in the UE-centric network, a plurality of network side devices such as small cells may have independent controllers such as distributed controllers. Each small cell can independently schedule a user, and information is exchanged between small cells for a long time, so that the small cell can provide a coordinated service for the UE flexibly to some extent.

In this embodiment of this application, different base stations may be base stations that have different identifies, or may be base stations that have a same identity and that are deployed at different geographical locations. Before being deployed, a base station does not know whether the base station is used in a scenario to which embodiments of this application are applied. Therefore, before being deployed, the base station or a baseband chip needs to support the method provided in embodiments of this application. It may be understood that the foregoing base stations that have different identifies may have base station identifies, cell identifies, or other identifies.

In this embodiment of this application, an NR network scenario in a wireless communication network is used as an example to describe some scenarios. It should be noted that the solutions in embodiments of this application may be further applied to another wireless communication network, and a corresponding name may also be replaced with a name of a corresponding function in the another wireless communication network.

Figure 2:
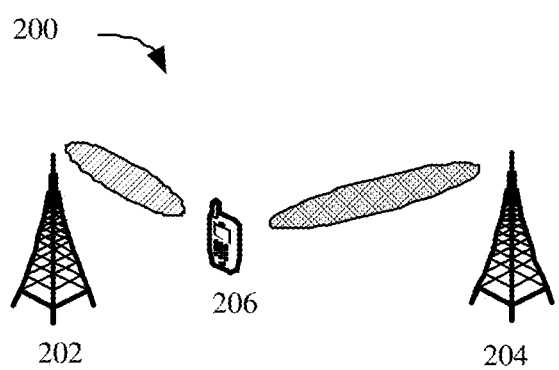
FIG. 2 is a schematic diagram of a communication system according to this application.

To better understand embodiments of this application, a communication system applicable to embodiments of this application is first described in detail by using a communication system shown in FIG. 2 as an example. FIG. 2 is a schematic diagram of a communication system to which a CGI processing method according to an embodiment of this application is applicable. As shown in FIG. 2, the communication system 200 includes a network device 202 and a terminal device 206. The network device 202 may be configured with a plurality of antennas, and the terminal device may also be configured with a plurality of antennas. Optionally, the communication system may further include a network device 204, and the network device 204 may also be configured with a plurality of antennas.

It should be understood that the network device 202 or the network device 204 may further include a plurality of components (for example, a processor, a modulator, a multiplexer, a demodulator, or a demultiplexer) related to signal sending and receiving.

The network device is a device that has a wireless transceiver function or a chip that may be disposed in the device. The device includes but is not limited to: an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), an access point (AP) in a wireless fidelity (Wi-Fi) system, a wireless relay node, a wireless backhaul node, and a transmission point (TP) or transmission and reception point (TRP); or may be a gNB or a transmission point (TP) in a 5G system such as an NR system, one or one group of antenna panels (including a plurality of antenna panels) of a base station in a 5G system; or may be a network node forming a gNB or a transmission point, such as a baseband unit (BBU) or a distributed unit (DU).

In some deployments, the gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer. The DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, it may also be considered that higher layer signaling, such as RRC layer signaling or PDCP layer signaling, may be sent by the DU or sent by the DU and the CU. It may be understood that the network device may be a CU node, a DU node, or a device including a CU node and a DU node. In addition, the CU may be classified as a network device in an access network RAN, or the CU may be classified as a network device in a core network CN. This is not limited herein.

The terminal device may also be referred to as user equipment (UE), an access terminal device, a subscriber unit, a subscriber station, a mobile station, a remote station, a remote terminal device, a mobile device, a user terminal device, a terminal device, a wireless communication device, a user agent, or a user apparatus. The terminal device in this embodiment of this application may be a mobile phone, a tablet computer (Pad), a computer that has a wireless transceiver function, a virtual reality (VR) terminal device, an augmented reality (AR) terminal device, a wireless terminal device in industrial control, a wireless terminal device in self-driving, a wireless terminal device in remote medical, a wireless terminal device in a smart grid, a wireless terminal device in transportation safety, a wireless terminal device in a smart city, a wireless terminal device in a smart home, or the like. An application scenario is not limited in this embodiment of this application. In this application, a terminal device having a wireless transceiver function and a chip that may be disposed in the terminal device are collectively referred to as a terminal device.

In the communication system 200, the network device 202 and the network device 204 may each communicate with a plurality of terminal devices (for example, the terminal device 206 shown in the figure). The network device 202 and the network device 204 may communicate with one or more terminal devices similar to the terminal device 206. However, it should be understood that a terminal device that communicates with the network device 202 may be the same as or different from a terminal device that communicates with the network device 204. The terminal device 206 shown in FIG. 2 may communicate with both the network device 202 and the network device 204. However, FIG. 2 shows only one possible scenario. In some scenarios, the terminal device may communicate only with the network device 202 or the network device 204. This is not limited in this application.

It should be understood that FIG. 2 is only a simplified schematic diagram used as an example for ease of understanding. The communication system may further include another network device or another terminal device. This is not shown in FIG. 2.

The following describes embodiments of this application in detail with reference to the accompanying drawings.

It should be understood that the technical solutions in this application are applicable to a wireless communication system, for example, the communication system 200 shown in FIG. 2. The communication system may include at least one network device and at least one terminal device, and the network device and the terminal device may communicate with each other through a wireless air interface. For example, the network device in the communication system may correspond to the network device 202 and the network device 206 shown in FIG. 2, and the terminal device may correspond to the terminal device 204 shown in FIG. 2.

Without loss of generality, the following describes embodiments of this application in detail by using an interaction process between a terminal device and a network device as an example. The terminal device may be a terminal device that is in a wireless communication system and that has a wireless connection relationship with the network device. It may be understood that the network device and a plurality of terminal devices that are in the wireless communication system and that have a wireless connection relationship may process a CGI based on a same technical solution. This is not limited in this application.

Figure 3:
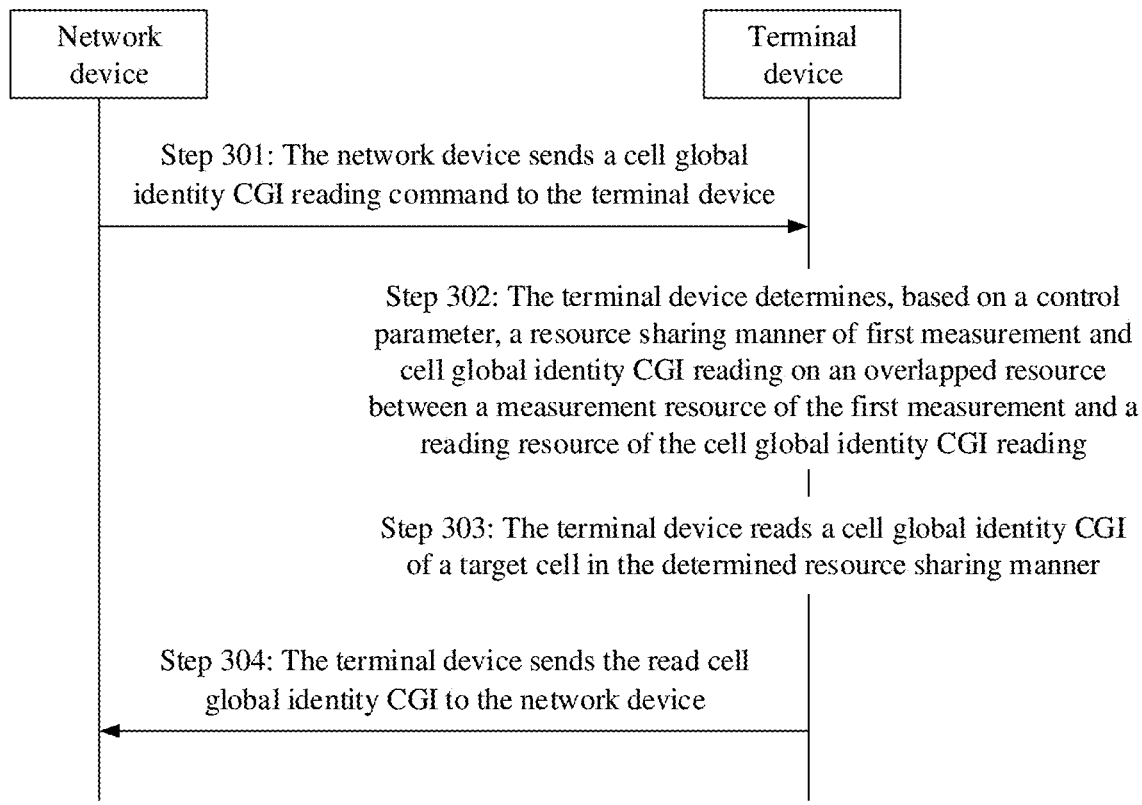
FIG. 3 is a schematic flowchart of a CGI processing method according to this application.

FIG. 3 is a flowchart of an example of a CGI processing method according to an embodiment of this application from a perspective of device interaction. As shown in FIG. 3, the method may include the following steps.

Step 301: A network device sends a CGI reading command to a terminal device.

In a possible implementation, the CGI reading command includes an identity of a target cell. The terminal device may read a CGI of the target cell based on the CGI reading command.

Step 302: The terminal device determines, based on a control parameter, a resource sharing manner of first measurement and CGI reading on an overlapped resource between a measurement resource of the first measurement and a reading resource of the CGI reading.

The control parameter is a parameter indicating that the first measurement and the CGI reading perform resource sharing on the overlapped resource, and the control parameter may be preset. After receiving the CGI reading command sent by the network device, the terminal device may obtain the preset control parameter.

In a possible implementation, the control parameter may alternatively be sent by the network device. It should be understood that the network device may send the CGI reading command and the control parameter to the terminal device by using same signaling or different signaling. When sending the CGI reading command and the control parameter to the terminal device by using different signaling, the network device may first send the control parameter and then send the CGI reading command, or may first send the CGI reading command and then send the control parameter, or may synchronously send the CGI reading command and the control parameter. This is not limited in this embodiment of this application.

In this embodiment of this application, the CGI reading includes MIB demodulation and SIB1 demodulation. The terminal device may separately determine, based on the control parameter, a resource sharing manner of the first measurement and the MIB demodulation and a resource sharing manner of the first measurement and the SIB1 demodulation on the overlapped resource between the measurement resource of the first measurement and the reading resource of the CGI reading.

The control parameter may include at least one of the following parameters: a frequency range, a time range, and a specified measurement type.

For example, the frequency range may be FR1 or FR1+FR2. The time range may start from receiving the CGI reading command by the terminal device and end in timing of a timer T321. Timing duration of the time T321 is maximum allowable time for the terminal device to perform the CGI reading, and is preset based on an empirical value. Alternatively, the time range may be less than the timing duration of the timer T321. For example, the duration of the timer T321 is 2 s, and the time range is 50 ms. The specified measurement types may be L1 measurement, L3 measurement, and the like in all measurement types supported by the terminal device. Alternatively, the specified measurement type may be L3 measurement, or another L3 measurement other than L3 measurement on a primary component carrier (primary component carrier, PCC), or may be another L3 measurement other than L3 measurement on a primary secondary component carrier (PSCC) or inter-frequency L3 measurement.

In this embodiment of this application, the resource sharing manner includes a first resource sharing manner and a second resource sharing manner. The first resource sharing manner is that the terminal device performs only the CGI reading on the overlapped resource. For example, as shown in FIG. 1, if the first measurement is the L3 measurement, a measurement resource of the first measurement overlaps a resource of the CGI reading. If the resource sharing manner of the first measurement and the CGI reading is the first resource sharing manner, the CGI reading is performed only on F1 on an overlapped resource (all white rectangles and black rectangles) between the CGI reading and the L3 measurement.

Figure 4:
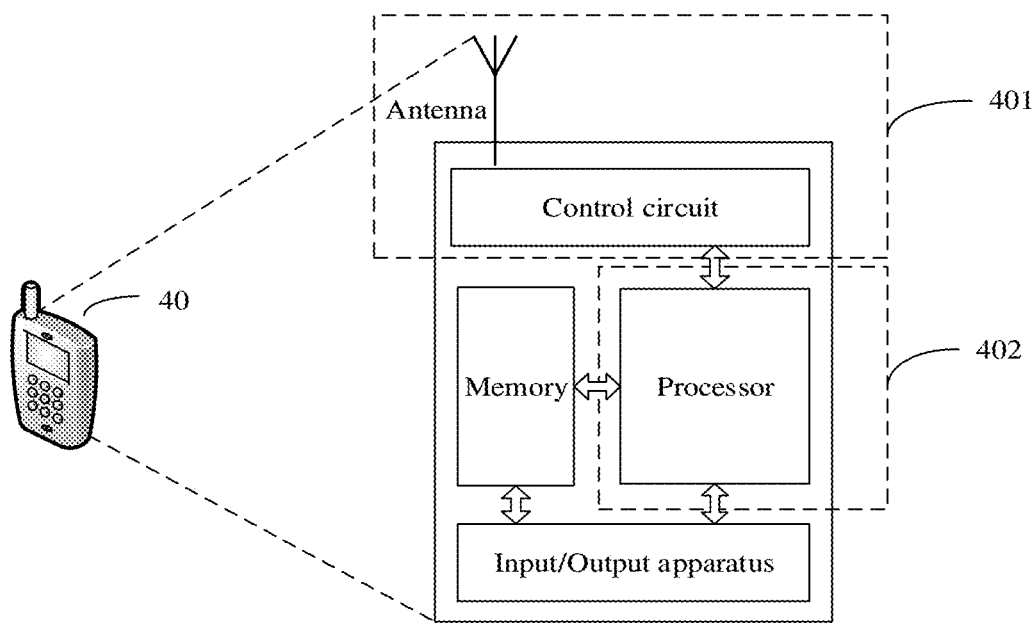
FIG. 4 is a schematic diagram of a terminal device according to this application.

The second resource sharing manner is a resource sharing manner in which the CGI reading is considered as a reference measurement type, and the reference measurement type and the first measurement are on the overlapped resource. For example, as shown in FIG. 4, the measurement resource of the first measurement overlaps the resource of the CGI reading, and the resource sharing manner of the first measurement and the CGI reading is the second sharing manner. In this case, the CGI reading may be considered as a reference measurement type. If the reference measurement type is inter-frequency L3 measurement, the CGI reading and the first measurement may be performed in a resource sharing manner of the reference measurement type and the first measurement on an overlapped resource. For example, the overlapped resource is allocated to the first measurement and the CGI reading based on a preset ratio. For example, the CGI reading on F1 is performed within the black rectangles, and shares measurement resources of the black rectangles with L3 measurement on F2 based on a ratio of 1:1. The L3 measurement on F3 is performed within the white rectangles, and is not affected by the CGI reading.

The reference measurement type may be predefined, or may be sent by the network device. The reference measurement type may be, for example, the L3 measurement or the L1 measurement. The preset ratio is related to the reference measurement type, and may be predefined based on an empirical value, for example, 1:1 or 1:2.

The following specifically describes a technical solution in which the terminal device determines, based on the control parameter, the resource sharing manner of the first measurement and the CGI reading.

Method 1: When the control parameter includes the specified measurement type, the first measurement and the CGI reading perform resource sharing in a first resource sharing manner if a measurement type of the first measurement is the specified measurement type; or the first measurement and the CGI reading perform resource sharing in a second resource sharing manner if a measurement type of the first measurement is another type other than the specified measurement type.

For example, the specified measurement type is inter-frequency L3 measurement. In this case, if the measurement type of the first measurement is the inter-frequency L3 measurement, the first measurement and the CGI reading perform resource sharing on the overlapped resource in the first resource sharing manner. If the measurement type of the first measurement is L1 measurement, intra-frequency L3 measurement, or the like, the first measurement and the CGI reading perform resource sharing on the overlapped resource in the second resource sharing manner. If a target frequency of the CGI reading is an intra-frequency frequency, the reference measurement type is the intra-frequency L3 measurement; or if a target frequency of the CGI reading is an inter-frequency frequency, the reference measurement type is the inter-frequency L3 measurement.

Method 2: When the control parameter includes the frequency range, the first measurement and the CGI reading perform resource sharing in a first resource sharing manner within the frequency range; or the first measurement and the CGI reading perform resource sharing in a second resource sharing manner beyond the frequency range.

For example, the frequency range is FR1, a target frequency of the CGI reading is f1. If f1∈FR1, the first measurement and the CGI reading perform resource sharing in the first resource sharing manner. If f1∉FR1, the first measurement and the CGI reading perform resource sharing in the second resource sharing manner.

Method 3: When the control parameter includes the time range, the first measurement and the CGI reading perform resource sharing in a first resource sharing manner within the time range; or the first measurement and the CGI reading perform resource sharing in a second resource sharing manner beyond the time range.

For example, the time range is within ins after the CGI reading command is received. In this case, the first measurement and the CGI reading perform resource sharing in the first resource sharing manner within the 10 s. After the CGI reading command is received for the 10 s, the first measurement and the CGI reading perform resource sharing in the second resource sharing manner.

Method 4: When the control parameter includes the frequency range and the time range, the first measurement and the CGI reading perform resource sharing in a first resource sharing manner within the frequency range and the time range.

In a possible implementation, if the control parameter includes the frequency range and the time range, the first measurement and the CGI reading perform resource sharing in a second resource sharing manner beyond the frequency range and/or beyond the time range.

For example, the frequency range is FR1, a target frequency of the CGI reading is f1, and the time range is within 5 s after the CGI reading command is received. In this case, within the 5 s, if f1∈FR1, the first measurement and the CGI reading perform resource sharing in the first resource sharing manner.

After the CGI reading command is received for the 5 s, if f1∈FR1, the first measurement and the CGI reading perform resource sharing in the second resource sharing manner; within the 5 s, if f1∉FR1, the first measurement and the CGI reading perform resource sharing in the second resource sharing manner; and after the CGI reading command is received for the 5 s, and when f1∉FR1, the first measurement and the CGI reading perform resource sharing in the second resource sharing manner.

Method 5: When the control parameter includes the frequency range and the specified measurement type, the first measurement and the CGI perform resource sharing in a first resource sharing manner within the frequency range if a measurement type of the first measurement is the specified measurement type.

In a possible implementation, when the control parameter includes the frequency range and the specified measurement type, the first measurement and the CGI perform resource sharing in a second resource sharing manner beyond the frequency range and/or if a measurement type of the first measurement is another type other than the specified measurement type.

For example, the frequency range is FR1, a target frequency of the CGI reading is f1, and the specified type is inter-frequency SFTD measurement. In this case, when f1∈FR1 and the measurement type of the first measurement is the inter-frequency SFTD measurement, the first measurement and the CGI reading perform resource sharing in the first resource sharing manner.

When f1∈FR1 and the measurement type of the first measurement is measurement other than the inter-frequency SFTD measurement, the first measurement and the CGI perform resource sharing in the second resource sharing manner; when f1∉FR1 and the measurement type of the first measurement is the inter-frequency SFTD measurement, the first measurement and the CGI perform resource sharing in the second resource sharing manner; and when f1∉FR1 and the measurement type of the first measurement is measurement other than the inter-frequency SFTD measurement, the first measurement and the CGI perform resource sharing in the second resource sharing manner.

Method 6: When the control parameter includes the time range and the specified measurement type, the first measurement and the CGI perform resource sharing in a first resource sharing manner within the time range if a measurement type of the first measurement is the specified measurement type.

In a possible implementation, when the control parameter includes the time range and the specified measurement type, the first measurement and the CGI perform resource sharing in a second resource sharing manner beyond the time range and/or if a measurement type of the first measurement is another type other than the specified measurement type.

For example, the time range is 5 s after the CGI reading command is received, and the specified measurement type is L3 measurement on a non-PCC/PSCC. In this case, within the 5 s after the CGI reading command is received, when the measurement type of the first measurement is the L3 measurement on the non-PCC/PSCC, the first measurement and the CGI reading perform resource sharing in the first resource sharing manner.

After the CGI reading command is received for the 5 s, and when the measurement type of the first measurement is the L3 measurement on the non-PCC/PSCC, the first measurement and the CGI reading perform resource sharing in the second resource sharing manner; within the 5 s after the CGI reading command is received, when the measurement type of the first measurement is L3 measurement on a PCC/PSCC, the first measurement and the CGI reading perform resource sharing in the second resource sharing manner; and after the CGI reading command is received for the 5 s, and when the measurement type of the first measurement is the L3 measurement on the non-PCC/PSCC, the first measurement and the CGI reading perform resource sharing in the second resource sharing manner.

Method 7: When the control parameter includes the frequency range, the time range, and the specified measurement type, the first measurement and the CGI perform resource sharing in a first resource sharing manner within the time range and the frequency range if a measurement type of the first measurement is the specified measurement type.

In a possible implementation, when the control parameter includes the frequency range, the time range, and the specified measurement type, the first measurement and the CGI perform resource sharing in a second resource sharing manner beyond the frequency range, and/or beyond the time range, and/or if a measurement type of the first measurement is another type other than the specified measurement type.

For example, the frequency range is FR1, a target frequency of the CGI reading is f1, the time range is 5 s after the CGI reading command is received, and the specified measurement type is L3 measurement. In this case, within the 5 s, when f1∈FR1 and the measurement type of the first measurement is the L3 measurement, the first measurement and the CGI reading perform resource sharing in the first resource sharing manner.

When any one of the frequency range, the time range, and the specified measurement type is not met, the first measurement and the CGI reading perform resource sharing in the second resource sharing manner.

It should be understood that the first measurement in this embodiment of this application may be measurement supported by a plurality of terminals. If there are a plurality of first measurement, for each first measurement, a resource sharing manner of the first measurement and the CGI reading is determined based on the technical solution in this embodiment of this application.

In this embodiment of this application, the terminal device may further determine, based on the control parameter, a first relaxation factor for a time requirement of the CGI reading and a second relaxation factor for a time requirement of the first measurement. The terminal device may perform the first measurement and the CGI reading on the overlapped resource in the determined resource sharing manner based on the first relaxation factor and the second relaxation factor. The first relaxation factor and the second relaxation factor may be specifically determined in the following manner 1 to manner 7.

Manner 1

(1) For the first relaxation factor, within the frequency range and the time range, if a measurement type of the first measurement is the specified measurement type, the first relaxation factor is a specified value.

The specified value may be, for example, 1, and may be preset based on an empirical value. In this case, the first relaxation factor may indicate that the time requirement is not relaxed. In other words, duration required for the terminal device to perform the CGI reading needs to meet the time requirement, and the time requirement is defined assuming that all measurement resources of the CGI reading are used for the CGI reading. Therefore, the terminal device needs to perform only the CGI reading on the overlapped resource to meet the time requirement.

In a possible implementation, if any one of the frequency range, the time range, and the specified measurement type is not met, the first relaxation factor is a relaxation factor for a reference measurement type for the reference measurement type and the first measurement on an overlapped resource.

(2) For the second relaxation factor, within the frequency range and the time range, if a measurement type of the first measurement is the specified measurement type, the second relaxation factor is undefined.

That the second relaxation factor is undefined may mean that there is no requirement on time required for the terminal device to perform the first measurement. Because the terminal device performs only the CGI reading on the overlapped resource, the terminal device may perform the first measurement after the CGI reading. That is, there is no time requirement for the first measurement during CGI reading.

In a possible implementation, if any one of the frequency range, the time range, and the specified measurement type is not met, the second relaxation factor is a relaxation factor for the first measurement for a reference measurement type and the first measurement on the overlapped resource.

Manner 2

(1) For the first relaxation factor, if a measurement type of the first measurement is another type other than the specified measurement type, the first relaxation factor is a relaxation factor for a reference measurement type when a measurement resource of the reference measurement type overlaps a measurement resource of the another type.

In a possible implementation, if the measurement type of the first measurement is the specified measurement type, the first relaxation factor is the foregoing specified value.

For example, the specified measurement type is inter-frequency L3 measurement. In this case, when the measurement type of the first measurement is the inter-frequency L3 measurement, the first relaxation factor is a specified value. When the measurement type of the first measurement is intra-frequency L3 measurement, the first relaxation factor is a relaxation factor for a reference measurement type when a measurement resource of the reference measurement type overlaps the measurement resource of the another type.

(2) For the second relaxation factor, if a measurement type of the first measurement is another type other than the specified measurement type, the second relaxation factor is a relaxation factor for the another type when a measurement resource of the another type overlaps a measurement resource of the reference measurement type.

In a possible implementation, if the measurement type of the first measurement is the specified measurement type, the second relaxation factor is undefined.

For example, the specified measurement type is L3 measurement. In this case, when the measurement type of the first measurement is the L3 measurement, the second relaxation factor is undefined. That is, there is no time requirement for the L3 measurement during CGI reading. When the measurement type of the first measurement is a measurement type other than the L3 measurement (for example, L1 measurement), the second relaxation factor is a relaxation factor for the L1 measurement when a measurement resource of the another type (for example, the L1 measurement) overlaps the measurement resource of the reference measurement type.

Manner 3

(1) For the first relaxation factor, beyond the frequency range and/or the time range, the first relaxation factor is a relaxation factor for a reference measurement type when a measurement resource of the reference measurement type overlaps the measurement resource of the first measurement.

In a possible implementation, within the frequency range and the time range, the first relaxation factor is the foregoing specified value.

For example, the frequency range is FR1, a target frequency of the CGI reading is f1, and the time range is within 10 s after the CGI reading command is received. In this case, within the 10 s, when f1∈FR1, the first relaxation factor is a specified value. After the 10 s, when f1∈FR1, the first relaxation factor is a relaxation factor for a reference measurement type when a measurement resource of the reference measurement type overlaps the measurement resource of the first measurement; and within the 10 s, when f1∉FR1, the first relaxation factor is the relaxation factor for the reference measurement type when the measurement resource of the reference measurement type overlaps the measurement resource of the first measurement.

(2) For the second relaxation factor, beyond the frequency range and/or the time range, the second relaxation factor is a relaxation factor for the first measurement when the measurement resource of the first measurement overlaps the measurement resource of the reference measurement type.

In a possible implementation, within the frequency range and the time range, the second relaxation factor is undefined.

For example, the frequency range is FR1, a target frequency of the CGI reading is f1, and the time range is within 10 s after the CGI reading command is received. In this case, within the 10 s, when f1∈FR1, the second relaxation factor is undefined. That is, there is no time requirement for the first measurement within the 10 s.

Within the 10 s, when f1∉FR1, the second relaxation factor is a relaxation factor for the first measurement when the measurement resource of the first measurement overlaps the measurement resource of the reference measurement type; after the 10 s, when f1∈FR1, the second relaxation factor is a relaxation factor for the first measurement when the measurement resource of the first measurement overlaps the measurement resource of the reference measurement type; and after the 10 s, when f1∉FR1, the second relaxation factor is a relaxation factor for the first measurement when the measurement resource of the first measurement overlaps the measurement resource of the reference measurement type.

Manner 4

(1) For the first relaxation factor, beyond the frequency range, and/or when a measurement type of the first measurement is another type other than the specified measurement type, the first relaxation factor is a relaxation factor for a reference measurement type when a measurement resource of the reference measurement type overlaps the measurement resource of the first measurement.

In a possible implementation, within the frequency range, if the measurement type of the first measurement is the specified measurement type, the first relaxation factor is the foregoing specified value.

For example, the frequency range is FR1, a target frequency of the CGI reading is f1, and the specified type is inter-frequency SFTD measurement. In this case, when f1∈FR1 and the measurement type of the first measurement is the inter-frequency SFTD measurement, the first relaxation factor is the foregoing specified value.

When f1∈FR1 and the measurement type of the first measurement is measurement other than the inter-frequency SFTD measurement, the first relaxation factor is a relaxation factor for a reference measurement type when a measurement resource of the reference measurement type overlaps the measurement resource of the first measurement; when f1∉FR1 and the measurement type of the first measurement is the inter-frequency SFTD measurement, the first relaxation factor is a relaxation factor for the reference measurement type when the measurement resource of the reference measurement type overlaps the measurement resource of the first measurement; and when f1∉FR1 and the measurement type of the first measurement is measurement other than the inter-frequency SFTD measurement, the first relaxation factor is a relaxation factor for the reference measurement type when the measurement resource of the reference measurement type overlaps the measurement resource of the first measurement.

(2) For the second relaxation factor, beyond the frequency range, and/or when a measurement type of the first measurement is another type other than the specified measurement type, the second relaxation factor is a relaxation factor for the another type when the measurement resource of the first measurement overlaps a measurement resource of the reference measurement type.

In a possible implementation, within the frequency range, if the measurement type of the first measurement is the specified measurement type, the second relaxation factor is undefined.

For example, the frequency range is FR1, a target frequency of the CGI reading is f1, and the specified type is inter-frequency SFTD measurement. In this case, when f1∈FR1 and the measurement type of the first measurement is the inter-frequency SFTD measurement, the second relaxation factor is undefined. That is, there is no time requirement for the first measurement during CGI reading.

When f1∈FR1 and the measurement type of the first measurement is non-inter-frequency SFTD measurement, the second relaxation factor is a relaxation factor for the non-inter-frequency SFTD measurement when the measurement resource of the first measurement overlaps the measurement resource of the reference measurement type; when f1∉FR1 and the measurement type of the first measurement is the inter-frequency SFTD measurement, the second relaxation factor is a relaxation factor for the non-inter-frequency SFTD measurement when the measurement resource of the first measurement overlaps the measurement resource of the reference measurement type; and when f1∉FR1 and the measurement type of the first measurement is the non-inter-frequency SFTD measurement, the second relaxation factor is a relaxation factor for the non-inter-frequency SFTD measurement when the measurement resource of the first measurement overlaps the measurement resource of the reference measurement type.

Manner 5

(1) For the first relaxation factor, beyond the time range, and/or when a measurement type of the first measurement is another type other than the specified measurement type, the first relaxation factor is a relaxation factor for a reference measurement type when a measurement resource of the reference measurement type overlaps the measurement resource of the first measurement.

In a possible implementation, within the time range, if the measurement type of the first measurement is the specified measurement type, the first relaxation factor is the foregoing specified value.

For example, the time range is 5 s after the CGI reading command is received. The specified measurement type is L3 measurement. In this case, within the 5 s after the CGI reading command is received, when the measurement type of the first measurement is the L3 measurement, the first relaxation factor is the foregoing specified value.

After the CGI reading command is received for the 5 s, and when the measurement type of the first measurement is the L3 measurement, the first relaxation factor is a relaxation factor for a reference measurement type when a measurement resource of the reference measurement type overlaps the measurement resource of the first measurement; within the 5 s after the CGI reading command is received, when the measurement type of the first measurement is measurement other than the L3 measurement, the first relaxation factor is a relaxation factor for a reference measurement type when a measurement resource of the reference measurement type overlaps the measurement resource of the first measurement; and after the CGI reading command is received for the 5 s, and when the measurement type of the first measurement is measurement other than the L3 measurement, the first relaxation factor is a relaxation factor for a reference measurement type when a measurement resource of the reference measurement type overlaps the measurement resource of the first measurement.

(2) For the second relaxation factor, beyond the time range, and/or when a measurement type of the first measurement is another type other than the specified measurement type, the second relaxation factor is a relaxation factor for the another type when a measurement resource of the reference measurement type overlaps the measurement resource of the first measurement.

In a possible implementation, within the time range and the frequency range, if the measurement type of the first measurement is the specified measurement type, the second relaxation factor is undefined.

For example, the time range is within 10 s after the CGI reading command is received. The specified measurement type is L3 measurement. In this case, within the 10 s, when the measurement type of the first measurement is the L3 measurement, the second relaxation factor is undefined. That is, there is no time requirement for the first measurement within the 10 s.

After the 10 s, when the measurement type of the first measurement is the L3 measurement, the second relaxation factor is a relaxation factor for the L3 measurement when the measurement resource of the reference measurement type overlaps the measurement resource of the first measurement; within the 10 s, when the measurement type of the first measurement is measurement other than the L3 measurement (for example, L1 measurement), the second relaxation factor is a relaxation factor for non-L3 measurement when the measurement resource of the reference measurement type overlaps the measurement resource of the first measurement; and after the 10 s, when the measurement type of the first measurement is the L3 measurement, the second relaxation factor is a relaxation factor for the L3 measurement when the measurement resource of the reference measurement type overlaps the measurement resource of the first measurement.

It should be understood that the first relaxation factor and the second relaxation factor in this embodiment of this application are related to the resource sharing manner. When the resource sharing manner is the first resource sharing manner, the first relaxation factor is the specified value, and the second relaxation factor is undefined. When the resource sharing manner is the second resource sharing manner, the first relaxation factor is the relaxation factor for the reference measurement type when the measurement resource of the reference measurement type overlaps the measurement resource of the first measurement; and the second relaxation factor is the relaxation factor for the first measurement when the measurement resource of the reference measurement type overlaps the measurement resource of the first measurement.

It should be noted that, when the measurement resource of the reference measurement type overlaps the measurement resource of the first measurement, the relaxation factor for the reference measurement type and the relaxation factor for the first measurement may be determined in advance based on an empirical value, or may be defined already in a standard. For example, when the measurement resource of the reference measurement type overlaps the measurement resource of the first measurement, and the second resource sharing manner is to allocate the overlapped resource to the first measurement and the CGI reading based on a ratio of 1:2, the first relaxation factor is ⅔, and the second relaxation factor is ⅓. For example, the reference measurement type is the L3 measurement, and a resource sharing manner of the L3 measurement and various measurement (including the L3 measurement and the L3 measurement) is defined already in 38.133.

Step 303: The terminal device performs the first measurement and the CGI reading in the determined resource sharing manner.

In a possible implementation, the terminal device may fail to read the CGI, or may not read the CGI within the time requirement. In this case, the terminal device may send, to the network device, information indicating that the CGI fails to be read.

Step 304: The terminal device sends the read CGI to the network device.

In a possible implementation, the network device may further receive the information that is sent by the terminal device and that indicates that the CGI fails to be read.

The CGI processing method in embodiments of this application is described above in detail with reference to FIG. 1 to FIG. 3. A CGI processing apparatus in embodiments of this application is described below in detail with reference to FIG. 4 to FIG. 6.

FIG. 4 is a schematic diagram of a structure of a terminal device according to an embodiment of this application. The terminal device may be used in the system shown in FIG. 1, and perform functions of the terminal device in the foregoing method embodiments. For ease of description, FIG. 4 shows only main components of the terminal device. As shown in FIG. 4, the terminal device 40 includes a processor, a memory, a control circuit, an antenna, and an input/output apparatus. The processor is mainly configured to: process a communication protocol and communication data, control the entire terminal device, execute a software program, and process data of the software program. For example, the processor is configured to support the terminal device in performing the actions described in the foregoing method embodiments, for example, receiving a CGI reading command sent by the network device. The memory is mainly configured to store the software program and the data, for example, store the control parameter described in the foregoing embodiments. The control circuit is mainly configured to: perform conversion between a baseband signal and a radio frequency signal, and process the radio frequency signal. The control circuit and the antenna together may also be referred to as a transceiver, and are mainly configured to receive and send a radio frequency signal in a form of an electromagnetic wave. The input/output apparatus, for example, a touchscreen, a display, or a keyboard is mainly configured to: receive data input by a user and output data to the user.

After the terminal device is powered on, the processor may read the software program in a storage unit, explain and execute instructions of the software program, and process the data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends a radio frequency signal in the form of an electromagnetic wave through the antenna. When data is to be sent to the terminal device, the radio frequency circuit receives the radio frequency signal through the antenna, converts the radio frequency signal into a baseband signal, and outputs the baseband signal to the processor. The processor converts the baseband signal into data and processes the data.

A person skilled in the art may understand that for ease of description, FIG. 4 shows only one memory and only one processor. An actual terminal device may include a plurality of processors and a plurality of memories. The memory may also be referred to as a storage medium, a storage device, or the like. This is not limited in this embodiment of this application.

In an optional implementation, the processor may include a baseband processor and/or a central processing unit. The baseband processor is mainly configured to process a communication protocol and communication data. The central processing unit is mainly configured to control the entire terminal device, execute a software program, and process data of the software program. Functions of the baseband processor and the central processing unit may be integrated into the processor in FIG. 4. A person skilled in the art may understand that the baseband processor and the central processing unit may alternatively be processors independent of each other, and are interconnected through technologies such as a bus. A person skilled in the art may understand that the terminal device may include a plurality of baseband processors to adapt to different network standards, the terminal device may include a plurality of central processing units to enhance a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of the software program. The processor executes the software program to implement a baseband processing function.

In this embodiment of this application, the antenna and the control circuit that have a transceiver function may be considered as a transceiver unit 401 of the terminal device 40. For example, the transceiver unit is configured to support the terminal device in performing the receiving function and the sending function described in FIG. 3. The processor that has a processing function is considered as a processing unit 402 of the terminal device 40. As shown in FIG. 4, the terminal device 40 includes the transceiver unit 401 and the processing unit 402. The transceiver unit may also be referred to as a transceiver, a transceiver machine, a transceiver apparatus, or the like. Optionally, a device that is in the transceiver unit 401 and that is configured to implement a receiving function may be considered as a receiving unit, and a device that is in the transceiver unit 401 and that is configured to implement a sending function may be considered as a sending unit. In other words, the transceiver unit 401 includes the receiving unit and the sending unit. The receiving unit may also be referred to as a receiver, an input port, a receiver circuit, or the like, and the sending unit may be referred to as a transmitter machine, a transmitter, a transmitter circuit, or the like.

The processor 402 may be configured to execute instructions stored in the memory, to control the transceiver unit 401 to receive a signal and/or send a signal, to complete the functions of the terminal device in the foregoing method embodiments. In an implementation, a function of the transceiver unit 401 may be implemented by using a transceiver circuit or a dedicated transceiver chip.

Figure 5:
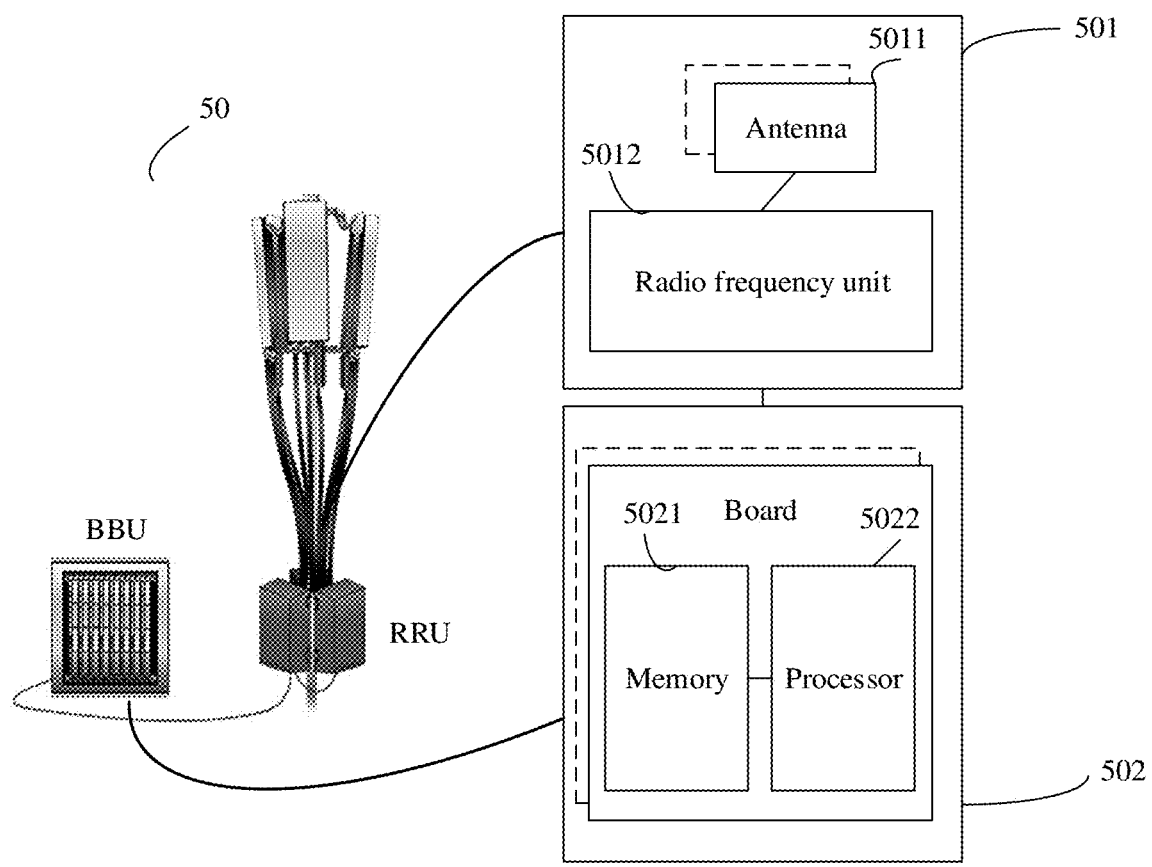
FIG. 5 is a schematic diagram of a network device according to this application.

FIG. 5 is a schematic diagram of a structure of a network device according to an embodiment of this application, for example, may be a schematic diagram of a structure of a base station 50. As shown in FIG. 5, the base station 50 may be used in the system shown in FIG. 2, and performs functions of the base station in the foregoing method embodiments. The base station 50 may include one or more radio frequency units such as a remote radio unit (RRU) 501 and one or more baseband units (BBU) (which may also be referred to as digital units (DU)) 502. The RRU 501 may be referred to as a transceiver unit, a transceiver machine, a transceiver circuit, a transceiver, or the like, and may include at least one antenna 5011 and a radio frequency unit 5012. The RRU 501 is mainly configured to: receive and send a radio frequency signal, and perform conversion between a radio frequency signal and a baseband signal, for example, is configured to send the CGI reading command in the foregoing embodiments to a terminal. The BBU 502 is mainly configured to: perform baseband processing, control the base station, and the like. The RRU 501 and the BBU 502 may be physically disposed together; or may be physically separate, that is, may be in a distributed base station.

The BBU 502 is a control center of the base station, may also be referred to as a processing unit, and is mainly configured to implement a baseband processing function such as channel coding, multiplexing, modulation, or spreading. For example, the BBU (the processing unit) 502 may be configured to control the base station to perform the operation procedure related to the network device in the foregoing method embodiments.

In an example, the BBU 502 may include one or more boards, and a plurality of boards may jointly support a radio access network (for example, an LTE network) with a single access indication, or may separately support radio access networks (for example, an LTE network, a 5G network, or another network) of different access standards. The BBU 502 further includes a memory 5021 and a processor 5022. The memory 5021 is configured to store necessary instructions and data. The processor 5022 is configured to control the base station to perform necessary actions, for example, is configured to control the base station to execute the operation procedure related to the base station in the foregoing method embodiments. The memory 5021 and the processor 5022 may serve the one or more boards. In other words, the memory and the processor may be separately disposed on each board. Alternatively, the plurality of boards may share a same memory and a same processor. In addition, a necessary circuit may be further disposed on each board.

Figure 6:
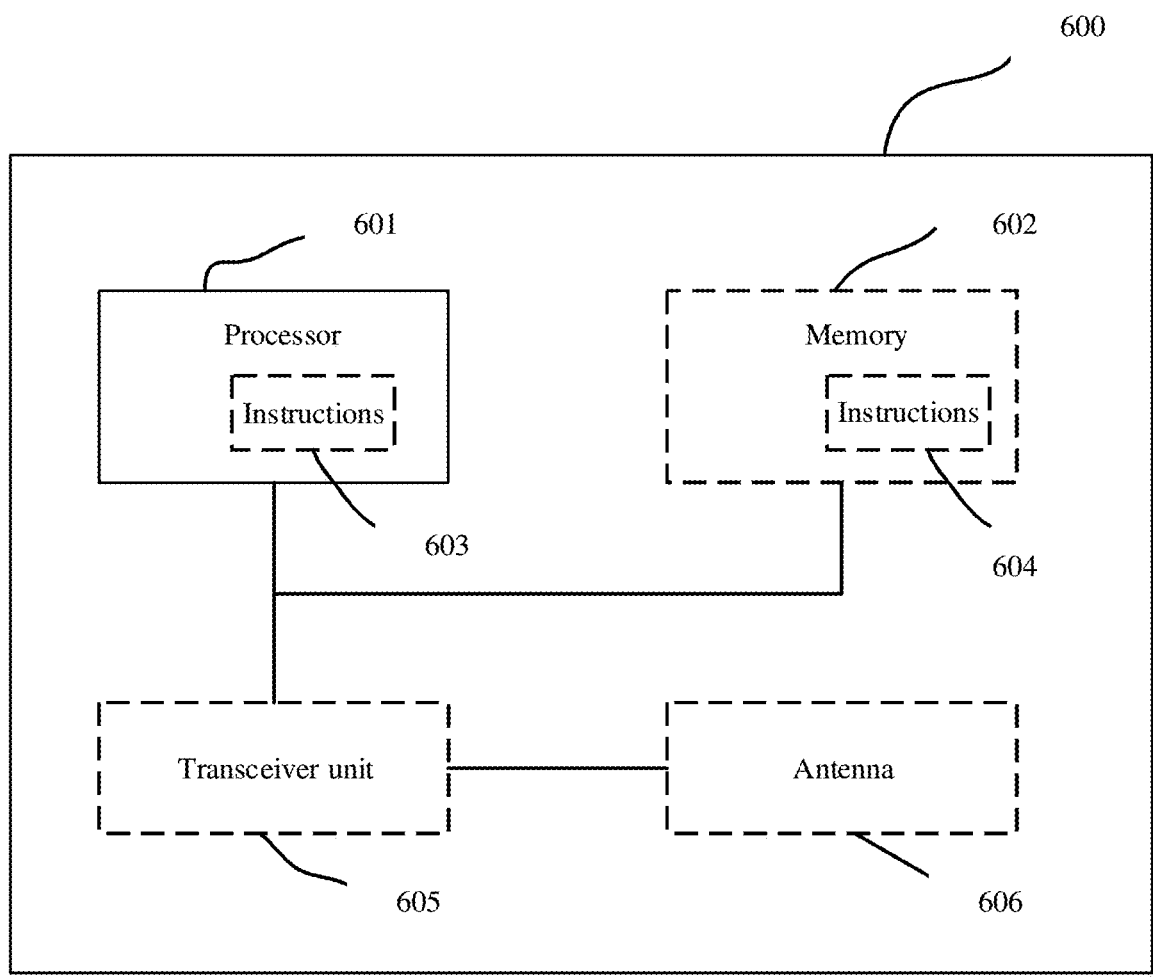
FIG. 6 is a schematic diagram of a communication apparatus according to this application.

FIG. 6 is a schematic diagram of a structure of a communication apparatus 600. The apparatus 600 may be configured to implement the method described in the foregoing method embodiments. For details, refer to the descriptions in the foregoing method embodiments. The communication apparatus 600 may be a chip, a network device (for example, a base station), a terminal device, another network device, or the like.

The communication apparatus 600 includes one or more processors 601. The processor 601 may be a general-purpose processor, a dedicated processor, or the like. For example, the processor may be a baseband processor or a central processing unit. The baseband processor may be configured to process a communication protocol and communication data. The central processing unit may be configured to: control a communication apparatus (for example, a base station, a terminal, or a chip), execute a software program, and process data of the software program. The communication apparatus may include a transceiver unit, configured to input (receive) and output (send) a signal. For example, the communication apparatus may be a chip, and the transceiver unit may be an input and/or output circuit or a communication interface of the chip. The chip may be used for a terminal, a base station, or another network device. In another example, the communication apparatus may be a terminal, a base station, or another network device, and the transceiver unit may be a transceiver, a radio frequency chip, or the like.

The communication apparatus 600 includes the one or more processors 601, and the one or more processors 601 may implement the method performed by the base station or the terminal in the embodiment shown in FIG. 2.

In a possible design, the communication apparatus 600 includes a means configured to determine a resource sharing manner of first measurement and CGI reading. The communication apparatus may determine the resource sharing manner of the first measurement and the CGI reading by using the one or more processors. For example, at least one target traffic beam may be determined by using the one or more processors, and a CGI reading command is received by using the transceiver, the input/output circuit, or the interface of the chip. For details, refer to related descriptions in the foregoing method embodiments.

In a possible design, the communication apparatus 600 includes a means (means) configured to generate a control parameter. For the control parameter and a manner in which the control parameter is generated, refer to related descriptions in the foregoing method embodiments. For example, the control parameter may be sent by using the transceiver, the input/output circuit, or the interface of the chip, and the control parameter is generated by using the one or more processors. Optionally, the processor 601 may further implement another function in addition to the method in the embodiment shown in FIG. 3.

Optionally, in a design, the processor 601 may execute instructions, so that the communication apparatus 600 performs the method described in the foregoing method embodiments. All or some of the instructions, for example, instructions 603, may be stored in the processor, or all or some of the instructions, for example, instructions 604, may be stored in a memory 602 coupled to the processor. Alternatively, the communication apparatus 600 may be enabled, by using both instructions 603 and 604, to perform the method described in the foregoing method embodiments.

In another possible design, the communication apparatus 600 may alternatively include a circuit. The circuit may implement a function of the network device or the terminal device in the foregoing method embodiments.

In still another possible design, the communication apparatus 600 may include one or more memories 202. The one or more memories store instructions 604. The instructions may be run on the processor, to enable the communication apparatus 600 to perform the method described in the foregoing method embodiments. Optionally, the memory may further store data. Optionally, the processor may also store instructions and/or data. For example, the one or more memories 602 may store the synchronization protocol header described in the foregoing embodiments, or the PDCP indication information in the foregoing embodiments. The processor and the memory may be separate, or may be integrated together.

In yet another possible design, the communication apparatus 600 may further include a transceiver unit 605 and an antenna 606. The processor 601 may be referred to as a processing unit, and controls the communication apparatus (a terminal or a base station). The transceiver unit 605 may be referred to as a transceiver machine, a transceiver circuit, a transceiver, or the like, and is configured to implement a transceiver function of the communication apparatus through the antenna 606.

This application further provides a communication system, including the foregoing one or more network devices and one or more terminal devices.

It should be noted that, the processor in this embodiment of this application may be an integrated circuit chip, and has a signal processing capability. During implementation, the steps in the foregoing method embodiments can be completed by using a hardware integrated logical circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor, or the like. The steps in the methods disclosed with reference to embodiments of this application may be directly performed and completed by using a hardware decoding processor, or may be performed and completed by using a combination of hardware and software modules in a decoding processor. The software module may be located in a mature storage medium in the art, for example, a random access memory, a flash memory, a read-only memory, a programmable read-only memory, an electrically erasable programmable memory, or a register. The storage medium is located in a memory. The processor reads information in the memory and completes the steps in the foregoing methods in combination with hardware of the processor.

It may be understood that the memory in this embodiment of this application may be a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically erasable programmable read-only memory (Electrically EPROM, EEPROM), or a flash memory. The volatile memory may be a random access memory (Random Access Memory, RAM), used as an external cache. Through examples but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and the method described in this specification is intended to include but is not limited to these memories and any memory of another appropriate type.

An embodiment of this application further provides a computer-readable medium. The computer-readable medium stores a computer program. When the computer program is executed by a computer, the CGI processing method in any one of the foregoing method embodiments is implemented.

An embodiment of this application further provides a computer program product. When the computer program product is executed by a computer, the CGI processing method in any one of the foregoing method embodiments is implemented.

All or some of the foregoing embodiments may be implemented by software, hardware, firmware, or any combination thereof. When the software is used for implementation, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

An embodiment of this application further provides a processing apparatus, including a processor and an interface. The processor is configured to perform the CGI processing method in any one of the foregoing method embodiments.

It should be understood that the processing apparatus may be a chip. The processor may be implemented by hardware, or may be implemented by software. When the processor is implemented by the hardware, the processor may be a logic circuit, an integrated circuit, or the like. When the processor is implemented by the software, the processor may be a general-purpose processor. The general-purpose processor is implemented by reading software code stored in a memory. The memory may be integrated into the processor, or may be located outside the processor and exist independently.

It should be understood that "one embodiment" or "an embodiment" mentioned in the entire specification means that particular features, structures, or characteristics related to embodiments are included in at least one embodiment of this application. Therefore, "in one embodiment" or "in an embodiment" appearing throughout the specification does not refer to a same embodiment. In addition, these particular features, structures, or characteristics may be combined in one or more embodiments in any appropriate manner. It should be understood that sequence numbers of the foregoing processes do not mean execution sequences in embodiments of this application. The execution sequences of the processes should be determined based on functions and internal logic of the processes, and should not be construed as any limitation on the implementation processes of embodiments of this application.

In addition, the terms "system" and "network" are usually used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually represents an "or" relationship between the associated objects.

It should be understood that in this embodiment of this application, "B corresponding to A" indicates that B is associated with A, and B may be determined based on A. However, it should be further understood that determining B based on A does not mean that B is determined based only on A. B may alternatively be determined based on A and/or other information.

A person of ordinary skill in the art may be aware that, with reference to the examples described in embodiments disclosed in this specification, the units and algorithm steps can be implemented by electronic hardware, computer software, or a combination thereof. To clearly describe the interchangeability between the hardware and the software, the compositions and the steps in the examples are generally described based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the foregoing apparatus embodiments are only examples. For example, division into the units is only logical function division, and may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate. Components displayed as units may or may not be physical units, to be specific, may be located in one place, or may be distributed on a plurality of network units. Some or all of the units may be selected based on actual requirements to achieve the objectives of the solutions in embodiments of this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in a computer-readable medium. The computer-readable medium includes a computer storage medium and a communication medium, and the communication medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can be used to carry or store expected program code in a form of instructions or a data structure and can be accessed by the computer. In addition, any connection may be appropriately defined as a computer-readable medium. For example, if software is transmitted from a website, a server, or another remote source by using a coaxial cable, an optical fiber/cable, a twisted pair, a digital subscriber line (DSL), or wireless technologies such as infrared ray, radio, and microwave, the coaxial cable, optical fiber/cable, twisted pair, DSL, or wireless technologies such as infrared ray, radio, and microwave are included in fixation of a medium to which they belong. A disk (Disk) and a disc (disc) used in this application include a compact disc (CD), a laser disc, an optical disc, a digital versatile disc (DVD), a floppy disk, and a Blu-ray disc, where the disk usually copies data in a magnetic manner, and the disc copies data optically in a laser manner. The foregoing combination shall also be included in the protection scope of the computer-readable medium.

In conclusion, the foregoing descriptions are exemplary embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A method, comprising:
   receiving, by a terminal device, a cell global identity (CGI) reading command sent by a network device;
   determining, by the terminal device based on a control parameter, a resource sharing manner of first measurement and CGI reading on an overlapped resource between a measurement resource of the first measurement and a reading resource of the CGI reading, wherein the control parameter indicates that the first measurement and the CGI reading perform resource sharing on the overlapped resource; and
   performing, by the terminal device, the first measurement and the CGI reading in the determined resource sharing manner, wherein at least the first measurement is performed according to a relaxation factor for a time requirement of the first measurement,
   wherein the method further comprises performing, before the determining, by the terminal device based on the control parameter, the resource sharing manner of the first measurement and the CGI reading on the overlapped resource between the measurement resource of the first measurement and the reading resource of the CGI reading:
   receiving, by the terminal device, the control parameter sent by the network device;
   wherein the method further comprises determining, by the terminal device based on the control parameter, a first relaxation factor for a time requirement of the CGI reading and a second relaxation factor for the time requirement of the first measurement, wherein the second relaxation factor is the relaxation factor for the time requirement of the first measurement; and
   wherein performing, by the terminal device, the first measurement and the CGI reading in the determined resource sharing manner comprises:
   performing, by the terminal device, the first measurement and the CGI reading in the determined resource sharing manner based on the first relaxation factor and the second relaxation factor.

2. The method according to claim 1, wherein the CGI reading comprises a first substep and a second substep; and
   wherein determining, by the terminal device based on the control parameter, the resource sharing manner of the first measurement and the CGI reading on the overlapped resource between the measurement resource of the first measurement and the reading resource of the CGI reading comprises:
  determining, by the terminal device based on the control parameter, a resource sharing manner of the first measurement and the first substep and a resource sharing manner of the first measurement and the second substep on the overlapped resource between the measurement resource of the first measurement and the reading resource of the CGI reading.

3. The method according to claim 1, wherein the control parameter comprises at least one of the following:
  a frequency range, a time range, or a specified measurement type.

4. The method according to claim 3, wherein:
  when the control parameter comprises the specified measurement type, the first measurement and the CGI reading perform resource sharing in a first resource sharing manner when a measurement type of the first measurement is the specified measurement type; or the first measurement and the CGI reading perform resource sharing in a second resource sharing manner when a measurement type of the first measurement is another type other than the specified measurement type; or
  when the control parameter comprises the frequency range, the first measurement and the CGI reading perform resource sharing in a first resource sharing manner within the frequency range; or the first measurement and the CGI reading perform resource sharing in a second resource sharing manner beyond the frequency range; or
  when the control parameter comprises the time range, the first measurement and the CGI reading perform resource sharing in a first resource sharing manner within the time range;
  or the first measurement and the CGI reading perform resource sharing in a second resource sharing manner beyond the time range; or
  when the control parameter comprises the frequency range and the time range, the first measurement and the CGI reading perform resource sharing in a first resource sharing manner within the frequency range and the time range; or
  when the control parameter comprises the frequency range and the specified measurement type, the first measurement and the CGI reading perform resource sharing in a first resource sharing manner within the frequency range when a measurement type of the first measurement is the specified measurement type; or
  when the control parameter comprises the time range and the specified measurement type, the first measurement and the CGI reading perform resource sharing in a first resource sharing manner within the time range when a measurement type of the first measurement is the specified measurement type; or
  when the control parameter comprises the frequency range, the time range, and the specified measurement type, the first measurement and the CGI perform resource sharing in a first resource sharing manner within the time range and the frequency range when a measurement type of the first measurement is the specified measurement type.

5. The method according to claim 4, wherein:
  the first resource sharing manner is to perform the CGI reading on the overlapped resource; and
  the second resource sharing manner is a resource sharing manner of a reference measurement type and the first measurement on the overlapped resource.

6. The method according to claim 1, wherein the control parameter comprises at least one of the following: a frequency range, a time range, or a specified measurement type; and wherein:
  within the frequency range and the time range, when a measurement type of the first measurement is the specified measurement type, the first relaxation factor is a specified value; or
  when a measurement type of the first measurement is another type other than the specified measurement type, the first relaxation factor is a relaxation factor for a reference measurement type when a measurement resource of the reference measurement type overlaps a measurement resource of the another type; or
  beyond the frequency range or the time range, the first relaxation factor is a relaxation factor for a reference measurement type when a measurement resource of the reference measurement type overlaps the measurement resource of the first measurement.

7. The method according to claim 1, wherein the control parameter comprises at least one of the following: a frequency range, a time range, or a specified measurement type; and wherein:
  within the frequency range and the time range, when a measurement type of the first measurement is the specified measurement type, the second relaxation factor is undefined; or
  when a measurement type of the first measurement is another type other than the specified measurement type, the second relaxation factor is a relaxation factor for the another type when a measurement resource of the another type overlaps a measurement resource of a reference measurement type; or
  beyond the frequency range or the time range, the second relaxation factor is a relaxation factor for the first measurement when the measurement resource of the first measurement overlaps a measurement resource of a reference measurement type.

8. The method according to claim 1, wherein after the performing, by the terminal device, the first measurement and the CGI reading in the determined resource sharing manner, the method further comprises:
  sending, by the terminal device, a read CGI to the network device.

9. A method, comprising:
  generating, by a network device, a control parameter, wherein the control parameter indicates that first measurement and cell global identity (CGI) reading perform resource sharing on an overlapped resource between a measurement resource of the first measurement and a reading resource of the CGI reading;
  determining at least a relaxation factor for a time requirement of the first measurement; and
  sending, by the network device, a CGI reading command and the control parameter to a terminal device;
  wherein the method further comprises:
    determining, by the network device based on the control parameter, a first relaxation factor for a time requirement of the CGI reading and a second relaxation factor for the time requirement of the first measurement, and wherein the second relaxation factor is the relaxation factor for the time requirement of the first measurement; and wherein the control parameter comprises at least one of a frequency range, a time range, or a specified measurement type.

10. The method according to claim 9, wherein the CGI reading comprises a first substep and a second substep; and wherein generating, by the network device, the control parameter comprises:

generating, by the network device, control parameters of the first substep and the second substep.

11. The method according to claim 9, wherein:

when the control parameter comprises the specified measurement type, the first measurement and the CGI reading perform resource sharing in a first resource sharing manner when a measurement type of the first measurement is the specified measurement type; or the first measurement and the CGI reading perform resource sharing in a second resource sharing manner when a measurement type of the first measurement is another type other than the specified measurement type; or when the control parameter comprises the frequency range, the first measurement and the CGI reading perform resource sharing in a first resource sharing manner within the frequency range; or the first measurement and the CGI reading perform resource sharing in a second resource sharing manner beyond the frequency range; or when the control parameter comprises the time range, the first measurement and the CGI reading perform resource sharing in a first resource sharing manner within the time range; or the first measurement and the CGI reading perform resource sharing in a second resource sharing manner beyond the time range; or when the control parameter comprises the frequency range and the time range, the first measurement and the CGI reading perform resource sharing in a first resource sharing manner within the frequency range and the time range; or when the control parameter comprises the frequency range and the specified measurement type, the first measurement and the CGI reading perform resource sharing in a first resource sharing manner within the frequency range when a measurement type of the first measurement is the specified measurement type; or when the control parameter comprises the time range and the specified measurement type, the first measurement and the CGI reading perform resource sharing in a first resource sharing manner within the time range when a measurement type of the first measurement is the specified measurement type; or when the control parameter comprises the frequency range, the time range, and the specified measurement type, the first measurement and the CGI reading perform resource sharing in a first resource sharing manner within the time range and the frequency range when a measurement type of the first measurement is the specified measurement type.

12. The method according to claim 11, wherein the first resource sharing manner is to perform the CGI reading on the overlapped resource; and wherein the second resource sharing manner is a resource sharing manner of a reference measurement type and the first measurement on the overlapped resource.

13. The method according to claim 9, wherein:

within the frequency range and the time range, when a measurement type of the first measurement is the specified measurement type, the first relaxation factor is a specified value; or when a measurement type of the first measurement is another type other than the specified measurement type, the first relaxation factor is a relaxation factor for a reference measurement type when a measurement resource of the reference measurement type overlaps a measurement resource of the another type; or beyond the frequency range or the time range, the first relaxation factor is a relaxation factor for a reference measurement type when a measurement resource of the reference measurement type overlaps the measurement resource of the first measurement.

14. The method according to claim 9, wherein:

within the frequency range and the time range, when a measurement type of the first measurement is the specified measurement type, the second relaxation factor is undefined; or when a measurement type of the first measurement is another type other than the specified measurement type, the second relaxation factor is a relaxation factor for the another type when a measurement resource of the another type overlaps a measurement resource of a reference measurement type; or beyond the frequency range or the time range, the second relaxation factor is a relaxation factor for the first measurement when the measurement resource of the first measurement overlaps a measurement resource of a reference measurement type.

15. The method according to claim 9, further comprising:

after sending, by the network device, a CGI reading command and the control parameter to a terminal device, receiving, by the network device, a CGI sent by the terminal device.

16. An apparatus, comprising:

one or more processors; and one or more memories coupled to the one or more processors and storing programming instructions for execution by the one or more processors to cause the apparatus to perform a method comprising:

receiving a cell global identity (CGI) reading command sent by a network device;

determining, based on a control parameter, a resource sharing manner of first measurement and CGI reading on an overlapped resource between a measurement resource of the first measurement and a reading resource of the CGI reading, wherein the control parameter indicates that the first measurement and the CGI reading perform resource sharing on the overlapped resource; and performing the first measurement and the CGI reading in the determined resource sharing manner, wherein at least the first measurement is performed according to a relaxation factor for a time requirement of the first measurement;

wherein the method further comprises performing, before the determining, based on the control parameter, the resource sharing manner of the first measurement and the CGI reading on the overlapped resource between the measurement resource of the first measurement and the reading resource of the CGI reading:

receiving the control parameter sent by the network device;

wherein the method further comprises determining, based on the control parameter, a first relaxation factor for a time requirement of the CGI reading and a second relaxation factor for the time requirement of the first measurement, wherein the second relaxation factor is the relaxation factor for the time requirement of the first measurement; and
wherein performing the first measurement and the CGI reading in the determined resource sharing manner comprises:
  performing the first measurement and the CGI reading in the determined resource sharing manner based on the first relaxation factor and the second relaxation factor.

\* \* \* \* \*